Nov. 10, 1942.   F. W. CURTIS   2,301,525
MILLING MACHINE
Filed March 8, 1940   10 Sheets—Sheet 5

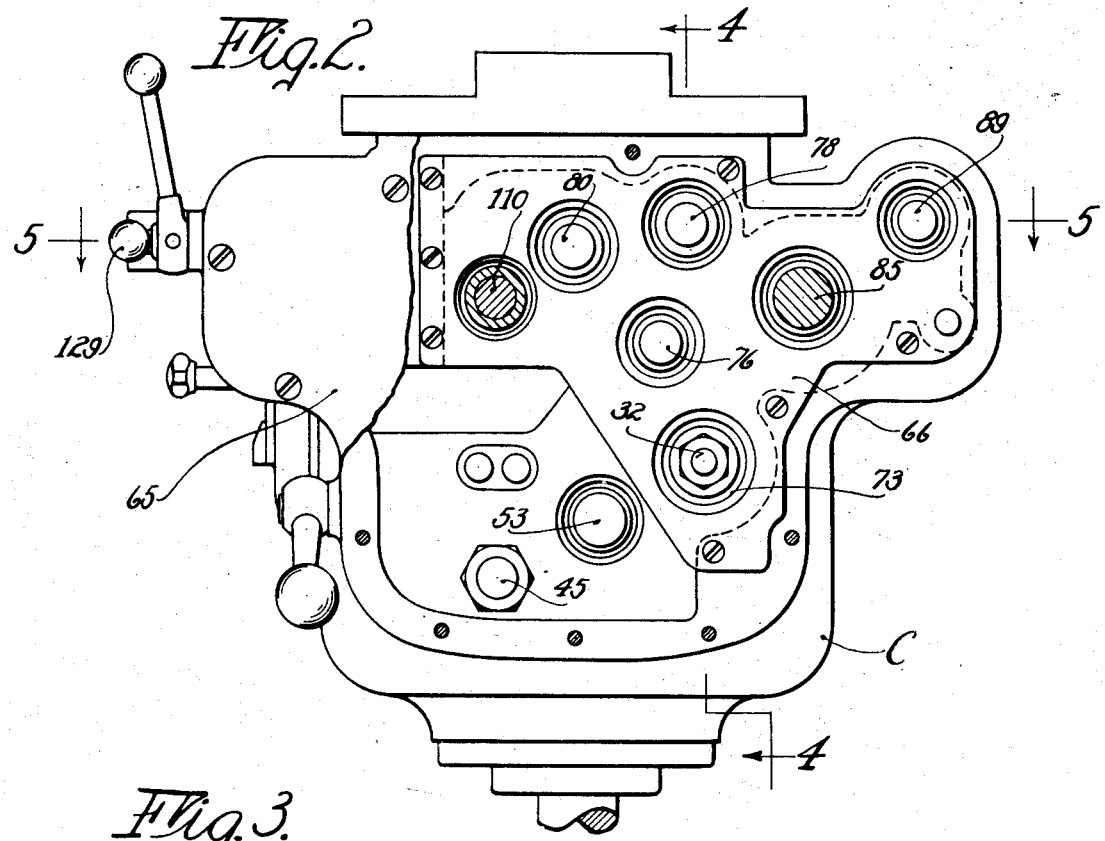
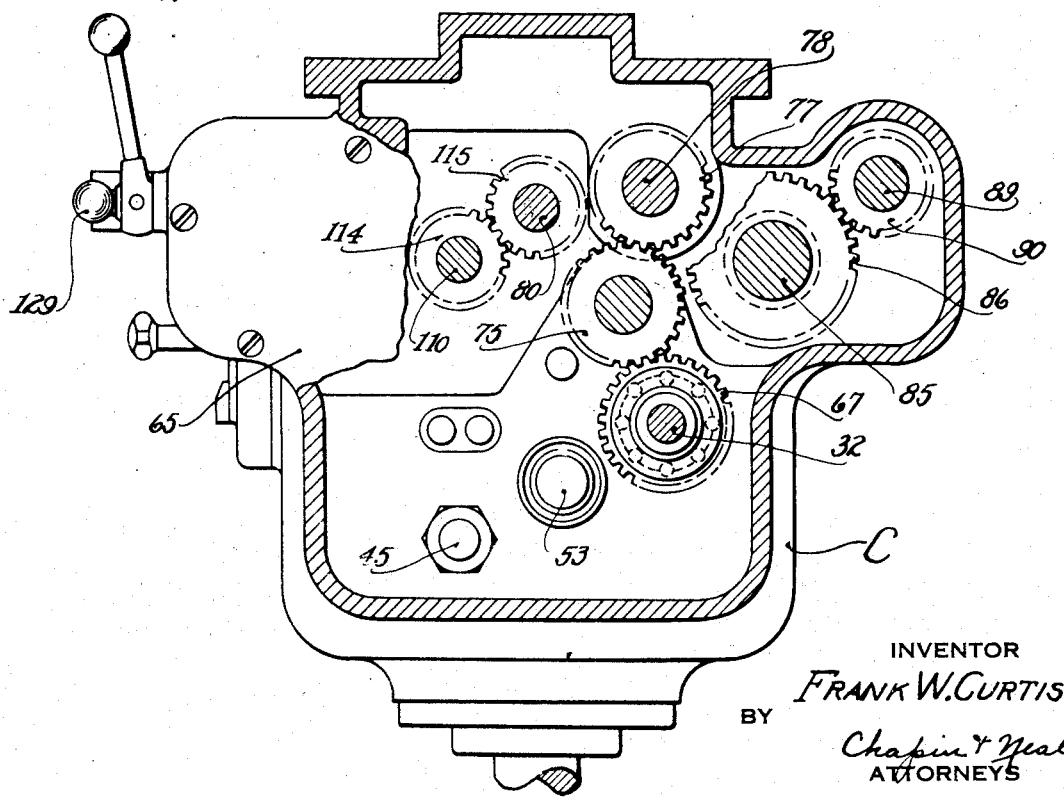

INVENTOR
FRANK W. CURTIS
BY
Chapin & Neal
ATTORNEYS

Nov. 10, 1942.  F. W. CURTIS  2,301,525
MILLING MACHINE
Filed March 8, 1940   10 Sheets-Sheet 6

INVENTOR
Frank W. Curtis
BY Chapin & Neal
ATTORNEYS

Nov. 10, 1942.  F. W. CURTIS  2,301,525
MILLING MACHINE
Filed March 8, 1940   10 Sheets—Sheet 7

INVENTOR
FRANK W. CURTIS
BY
Chapin & Neal
ATTORNEYS

Nov. 10, 1942.  F. W. CURTIS  2,301,525
MILLING MACHINE
Filed March 8, 1940   10 Sheets-Sheet 8
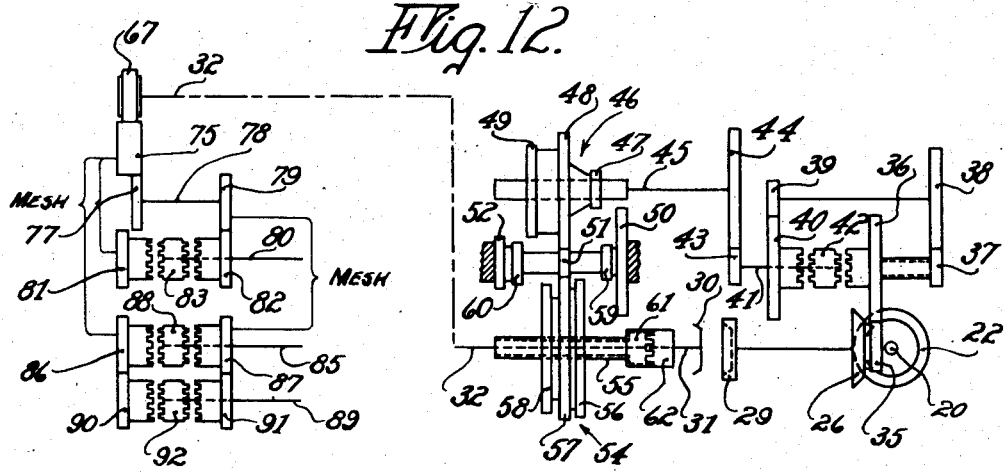
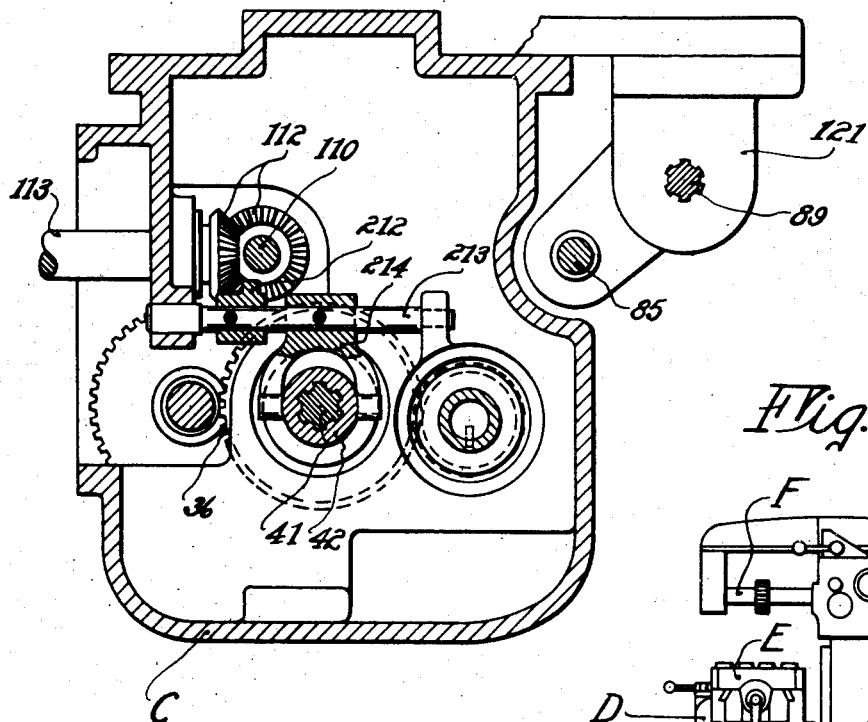
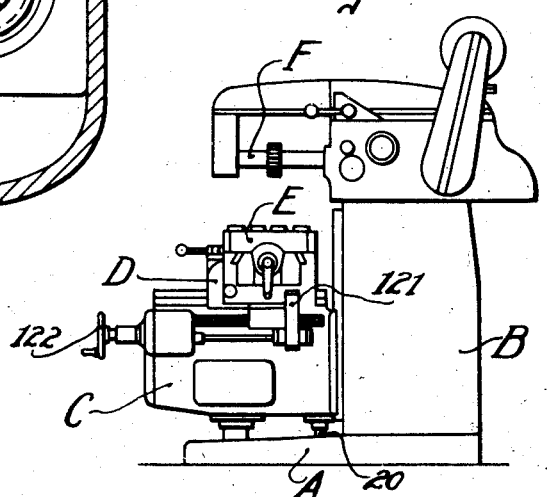
INVENTOR
FRANK W. CURTIS
BY
Chapin & Neal
ATTORNEYS Nov. 10, 1942.  F. W. CURTIS  2,301,525
MILLING MACHINE
Filed March 8, 1940   10 Sheets-Sheet 9

INVENTOR
FRANK W. CURTIS
BY Chapin & Neal
ATTORNEYS

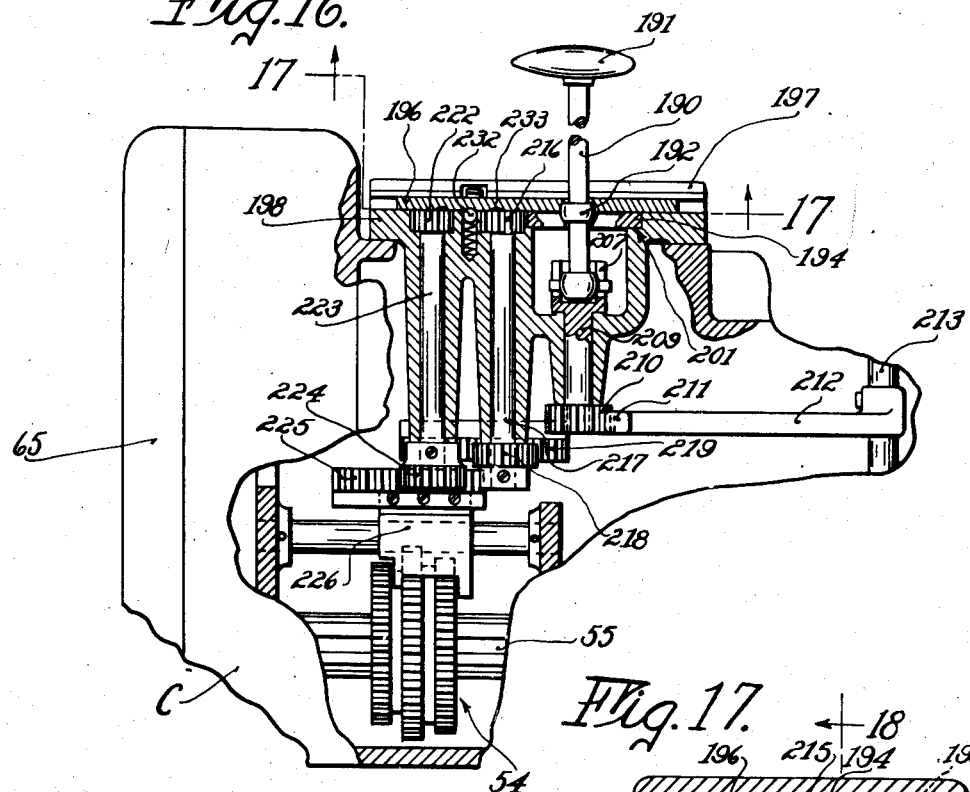
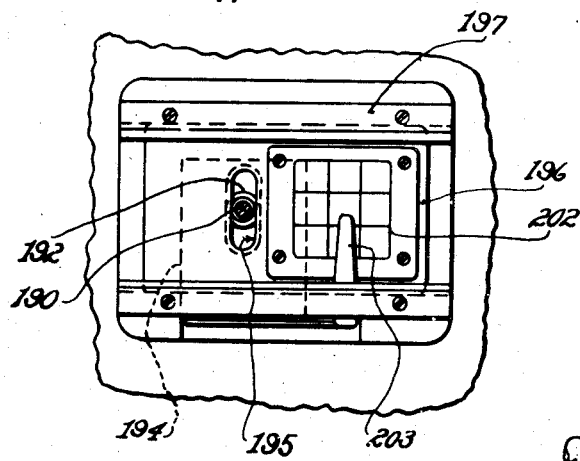
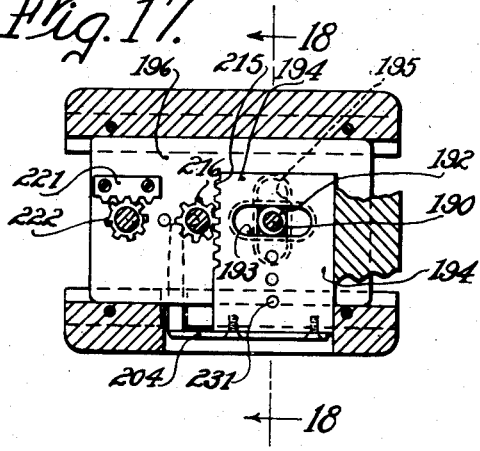
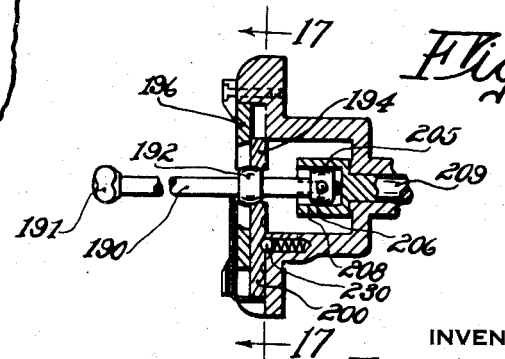
INVENTOR
FRANK W. CURTIS
BY
Chapin & Neal
ATTORNEYS Patented Nov. 10, 1942

2,301,525

UNITED STATES PATENT OFFICE 2,301,525

MILLING MACHINE

Frank W. Curtis, Springfield, Mass., assignor to Van Norman Machine Tool Company, Springfield, Mass., a corporation of Massachusetts Application March 8, 1940, Serial No. 322,973

19 Claims. (Cl. 90—21)

This invention relates primarily to improvements in milling machines, although in certain aspects these improvements may have a wider range of use.

One object of the invention is to improve the arrangement of gearing contained in the knee of a milling machine for driving the various table rates. In particular the invention is concerned with improvements in the manner in which the feed and rapid traverse drives are obtained from a single power drive shaft; in the arrangement of gearing whereby the weight distribution in and the consequent stability of the knee are improved; in the simplification of the distributing gearing for driving the table, saddle, and knee either forward or reverse at the selected rate, and in the arrangement of the gearing to facilitate a unitary control of the change gear mechanism. A further object is to improve the gear shifting control by which the feed rate is determined so that only a single handle need be moved to select the desired rate. A further object is to improve the knee structure so as to give improved stability and guidance to the elevating mechanism and so that the elevating mechanism itself will contribute to the stability of the knee. A further object is to improve the manner of mounting the shaft bearings in the knee to simplify their manufacture and increase their accessibility. A further object is to improve the table operating mechanism. Additional objects will appear from the following description and claims.

Referring to the drawings:

Fig. 2 is a front view thereof with the outer cover plate removed, taken on line 2—2 of Fig. 4;

Fig. 3 is a view similar to Fig. 2 but with a bearing supporting plate also removed, this view being taken on line 3—3 of Fig. 4;

Fig. 12 is a diagrammatic view of the gearing;

Fig. 13 is a sectional elevation on line 13—13 of Figs. 5 and 10;

Fig. 14 is a side elevation of the complete machine;

Fig. 16 is a detail of the feed change control;

Fig. 17 is a section on line 17—17 of Figs. 16 and 18;

Fig. 18 is a section on line 18—18 of Fig. 17; and

Fig. 19 is a detail of the feed rate indicator, the operating handle being broken away.

The invention as shown is applied to a milling machine of a standard type indicated in Fig. 14. In this figure the machine is mounted upon a base A, a column B arising from the base and having ways upon which a knee C slides vertically. A saddle D slides upon the knee toward and from the column and a table E is mounted to slide longitudinally upon the saddle. A spindle F, carrying a tool for operation upon work mounted on the table, is suitably supported in the column. The invention relates to structure contained for the most part within the housing of the knee for varying the rate of feed of the table, saddle and knee and for controlling the direction and operation of these elements. For this reason the description will be confined to the knee structure, it being understood that the mounting of the knee on the column, the structure and mounting of the saddle and table, and the driving mechanism for the spindle may all be arranged in accordance with standard practice or in any other way that may be desired.

Figure 4:
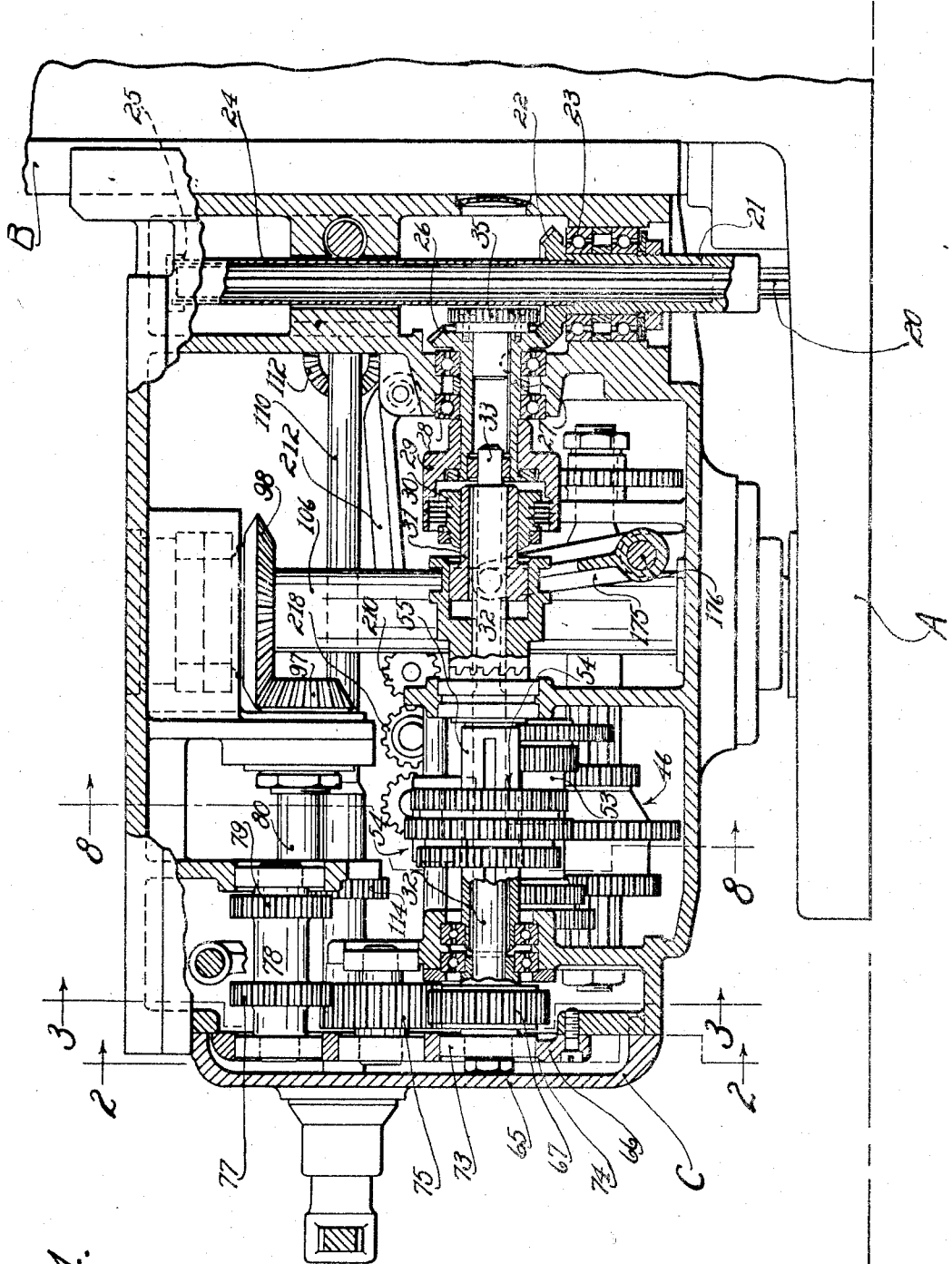
Fig. 4 is a sectional elevation, looking in the opposite direction from Fig. 1, and taken on line 4—4 of Fig. 2.
Figure 10:
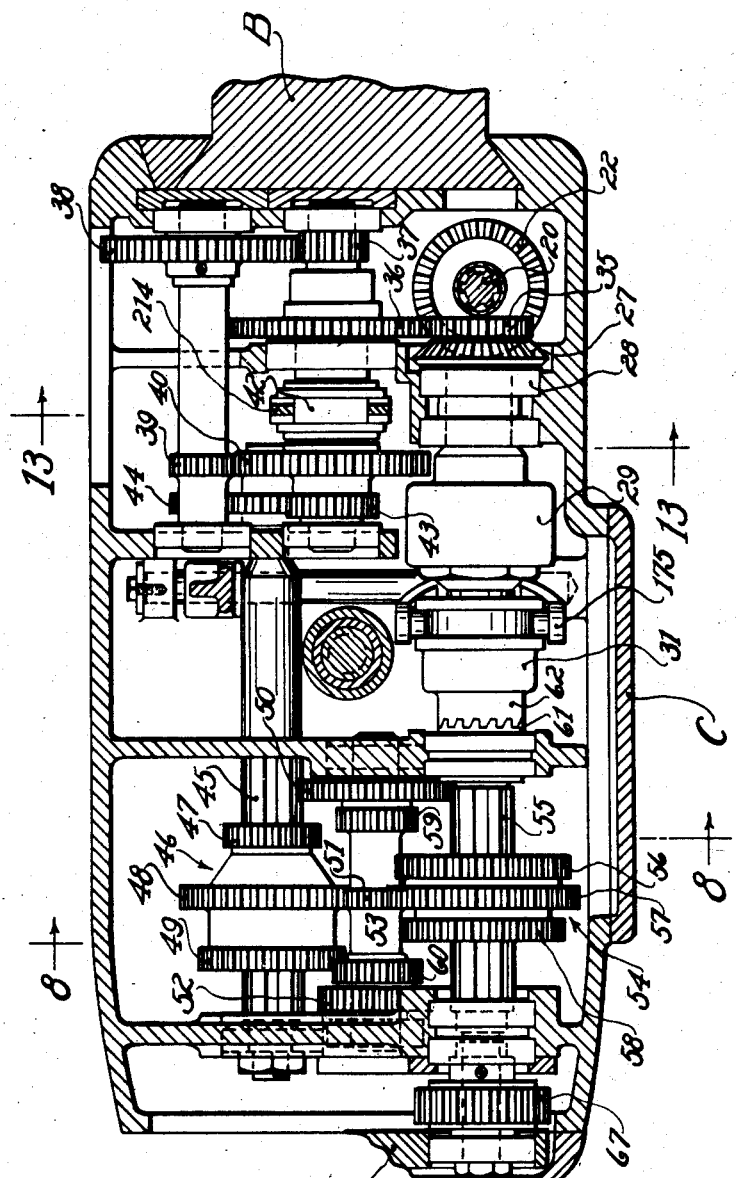
Fig. 10 is a sectional plan on line 10—10 of Fig. 8.

The power feed for the knee, saddle, and table is derived from a vertical shaft 20 mounted in the base and extending vertically into telescoping relation with the knee. This shaft may be driven from a suitable motor in any desired way not necessary to show here. The shaft 20 is splined as is shown in Figs. 4 and 10 and passes through the downwardly projecting shank 21 of a bevel gear 22 held in the knee structure by anti-friction bearings 23. In order to keep oil from leaking down the splines on this shaft a sleeve 24 is fitted into the bevel gear 22 and extends upwardly nearly to the top of the knee, being provided with a cap 25. In Fig. 4 the knee is shown in its lowermost position, and as the knee rises the shank 21 and the sleeve 24 will pass upwardly upon the splined shaft.

Meshing with the gearing 22 is a second bevel gear 26, the shank of which is mounted in anti-friction bearings 28 carried by the knee structure. In this case, as well as in many others, it will be understood in the following description that the knee is formed with internal webs to support the various bearings, it not being necessary for an understanding of the invention to consider all of these webs in detail. They will, however, be obvious from the drawings. The shank 27 carries one member 29 of a rapid traverse friction clutch, here shown as being of a standard multiple plate type. The driven clutch member 30 is carried by a sleeve 31 reciprocable upon a common drive shaft which is splined at its end adjacent the sleeve so that while the sleeve may reciprocate upon the shaft it is always coupled in driving relation to it. As will be seen from Fig. 4 the shaft 32 has a bearing portion 33 within the shank 27 of the gear 26.

The drives for the various table, saddle and knee movements are all taken off the common drive shaft 32; and this shaft, as well as being driven directly from the gear 26 through the rapid traverse clutch, may also be driven through the gearing now to be described at any of nine feed rates. For this purpose a gear 35 is secured to the face of the bevel gear 26 and meshes as shown in Figs. 10 and 12 with a gear 36 rotatably mounted in the knee structure. Fixed to the gear 36 is a pinion 37 meshing with a gear 38. Positively coupled to this latter gear is a pinion 39 meshing with a gear 40 coaxial with the gear 36. A splined shaft 41 (Figs. 12 and 13) passes freely through the gear 40 and has coupled to it a clutch member 42 (see also Fig. 10) which is shiftable into engagement either with the gear 36 or the gear 40. In this manner the splined shaft 41 may be driven either directly from the constantly rotating gear 36 or through the gear train 37, 38, 39, 40 which acts similarly to back gears to produce a lower rate of rotation of the driven shaft.

The splined shaft 41 carries a gear 43 meshing with a larger gear 44 upon a shaft 45 (Figs. 8, 10, and 12) journaled in the knee and provided at its end remote from the gear 44 with a splined portion upon which a cluster gear 46 slides. This cluster gear is composed of three gears 47, 48, and 49 which mesh respectively with gears 50, 51, and 52 upon a parallel idler shaft 53. A second cluster gear 54 is mounted for reciprocation on a splined sleeve 55 journalled for free rotation about the common drive shaft 32 previously described. This second cluster gear comprises gears 56, 57, and 58 meshing respectively with gears 59, 60, and 61 on the intermediate shaft 53. By shifting the cluster gear 46 three changes of feed rate may be secured. Each of these can be varied in three ways by shifting the cluster gear 54, making a total of nine changes, and each of these nine changes may be varied from a high rate to a low rate by means of the clutch 42, making a total of eighteen possible gear changes. The control of the various feed rates will be considered later.

The splined sleeve 55 carries a clutch member 61 cooperating with a clutch member 62 on the sleeve 31 previously referred to as being keyed on the common drive shaft. This common drive shaft extends to the front of the knee and from it are taken the forward and reverse drives for the table, the saddle and the knee feeds. The gearing which distributes the various feed and rapid traverse rates from the common drive shaft to the separate table movements are very compact and are all located at the front of the knee where their weight contributes largely to the steadiness of the knee and prevents chatter. The same weight concentrated near the column B would have a much less moment of inertia about the ways and would therefore have a higher rate of vibration more nearly corresponding to the frequency of those forces tending to produce vibration than is the case in the present structure. The cluster gears 46 and 54 are also located close to the front of the knee so that a very large proportion of the weight within the knee is concentrated at a position making for extreme steadiness in operation.

In order to facilitate this manner of mounting the gearing, to permit the more ready assembly of the bearings, and to simplify the machining of the knee frame, the front bearings for the various shafts and gear units are received in a bearing plate 66. This plate may be formed flat, and is thus easily machined. The plate, and the various bearings carried by it, are covered by a cover plate 65.

Figure 11:
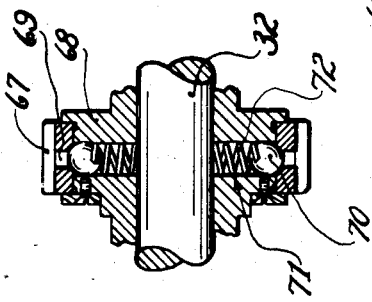
Fig. 11 is a detail of a load limiting gear.

The common drive shaft is provided with a safety gear 67 which operates to limit the torque which can be furnished from this shaft in order to prevent breakage if one of the table movements jams. By locating this safety gear on the common drive shaft it functions both for the various feed rates and for the rapid traverse drive. The structure of this gear is shown in detail in Fig. 11. The gear is made in the form of an annulus mounted for free rotation upon a hub 68 which is fastened upon the shaft 32. The annulus is formed with radial holes 69, the inner ends of which form seats for balls 70 carried in sockets 71 in the hub. The balls are forced outwardly with a predetermined pressure by springs 72 and, as will be seen, provide a coupling between the hub and the annulus which is positive until the torque reaches a point sufficient to compress the spring and allow the annulus to ride freely around on the hub.

Figure 6:
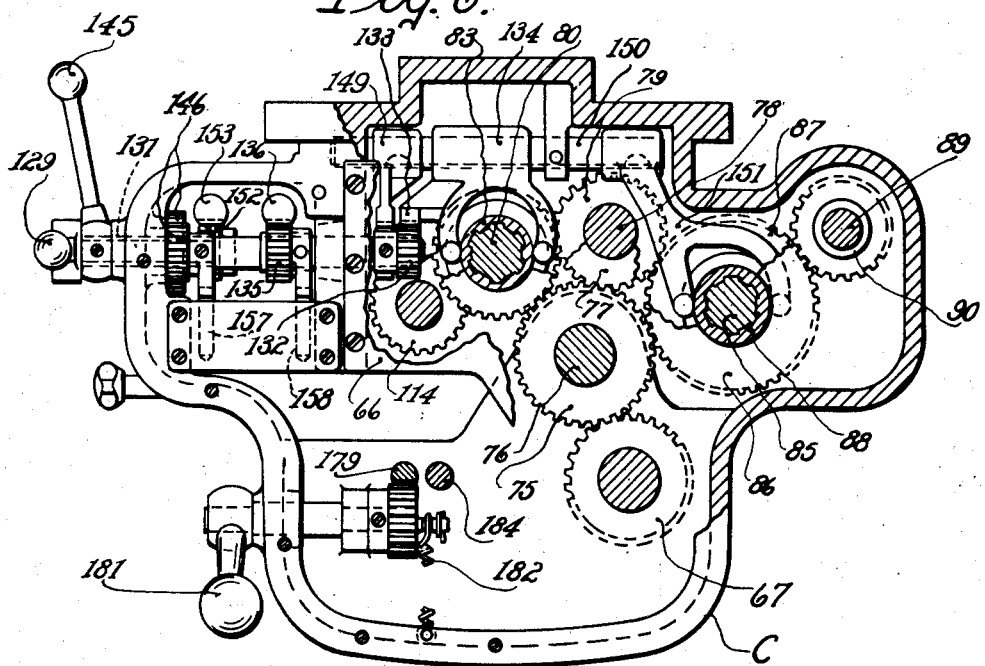
Fig. 6 is a section on line 6—6 of Fig. 5.

The safety gear 67, as will be seen best from Figs. 4, 6, and 12, meshes with a wide faced gear 75 which acts as a distributing gear. A gear 77 upon a reversing shaft 78 meshes with the wide faced gear 75, the shaft 78 also having a gear 79 fixed to it. The knee drive shaft 80 has gears 81 and 82 mounted to revolve freely about it, the former meshing with the wide faced gear 75 and the latter with the reversing gear 79. The gears 81 and 82 are provided with clutch teeth and a clutch 83 splined to the shaft 80 may be moved into contact with either of them to cause the shaft 80 to be rotated in one direction or the other or to be held inoperative by leaving the clutch in its central idle position. The saddle drive shaft 85 is similarly provided with freely rotating gears 86 and 87 meshing respectively with gears 75 and 79, and has a clutch 88 engageable with either of them or movable to an inactive position between them. The table drive shaft 89 carries gears 90 and 91 meshing directly with the gears 86 and 87 on the saddle drive shaft. The table drive shaft has a clutch 92 by which it may be connected with either one of its two driving gears.

Figure 7:
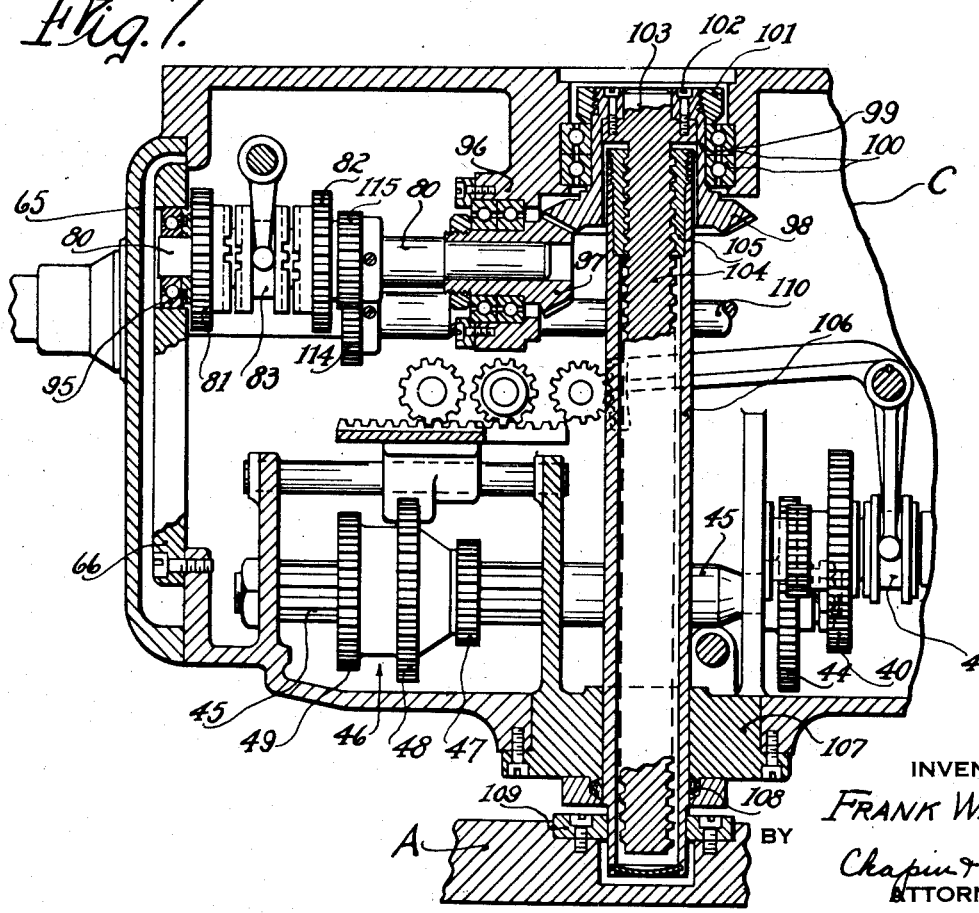
Fig. 7 is a section on line 7—7 of Fig. 8.

Passing now to the mechanism by which the knee is elevated either by power or manually; the knee drive shaft 80, which is journaled in the removable front plate 66 at 95 and also in the knee structure at 96, carries a bevel gear 97 meshing with a larger bevel gear 98 on a vertical axis. As is shown in Fig. 7, the gear 98 has a shank 99 mounted in anti-friction bearings 100 carried by the knee, the gear being held to these bearings by a shoulder on one side and by a threaded collar 101 on the other. The shank 99 is held by screws 102 to the enlarged top 103 of the elevating screw 104 which extends downwardly toward the base. The elevating screw passes through a nut 105 held as by threading in the upper end of a tube 106. This tube slides through a bearing 107 in the bottom of the knee, the bearing being preferably provided with a stuffing box 108 to prevent entrance of dirt or leakage of oil. The tube is clamped at 109 against rotation in the base A.

Figure 5:
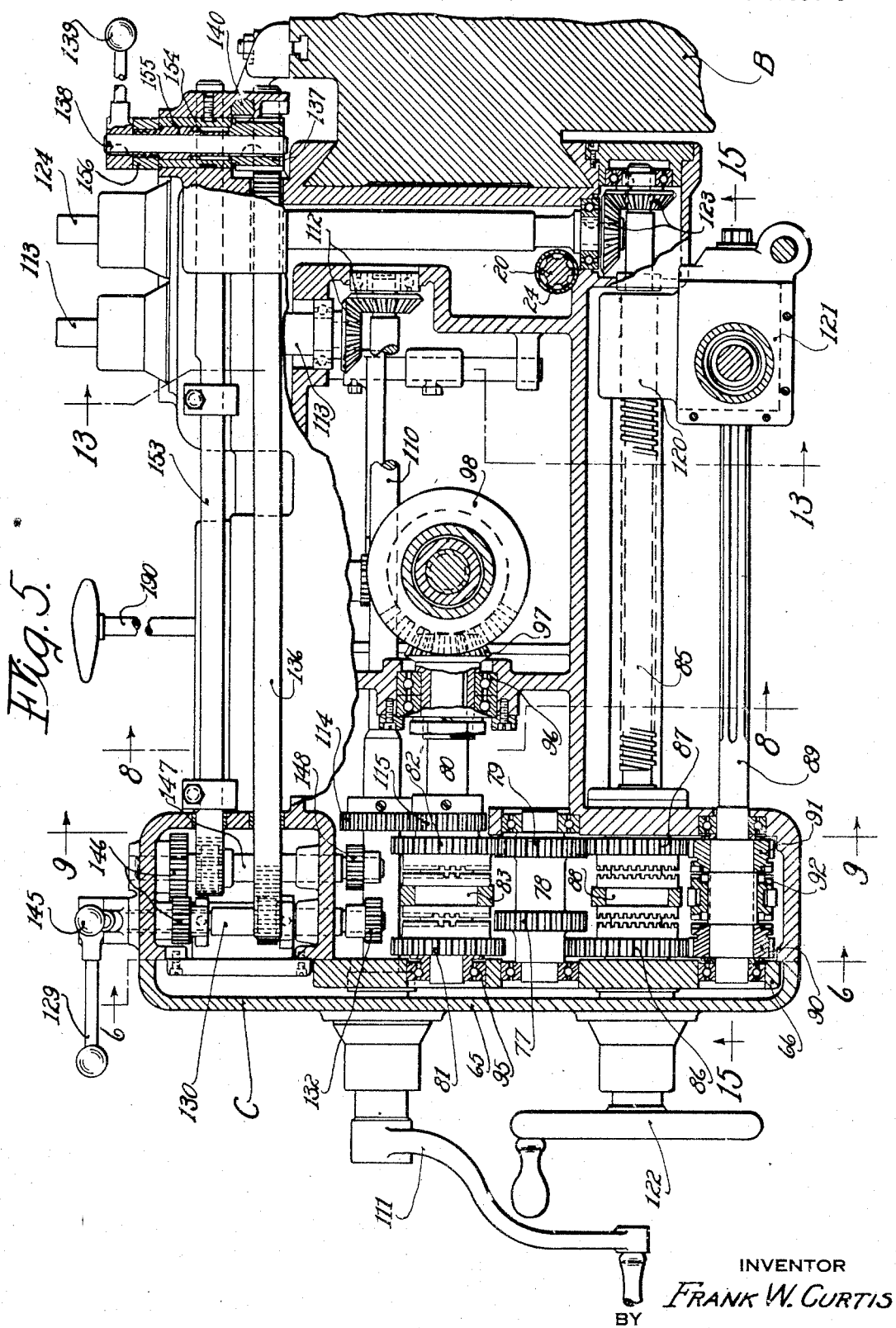
Fig. 5 is a sectional plan taken on line 5—5 of Fig. 2.

For manual operation a shaft 110 (Fig. 5) is provided, extending through the front plate and bearing a handle 111. The shaft may also be actuated from the rear of the machine through bevel gears 112 connecting it to a laterally extending shaft 113 suitably squared on the end to receive a handle. A gear 114 on the shaft 110 (see also Fig. 3) meshes with a gear 115 on the shaft 80, the handle 111 being preferably provided with a clutch connection with the shaft 110 of the usual type so that, while the shaft 110 rotates continually whenever the shaft 80 is being driven by power, the handle itself will not be rotated. This connection is common in the art and need not be described in detail.

The saddle drive is operated directly from the shaft 85, the latter being threaded so as to engage a nut 120 (Fig. 5) mounted in a bracket 121 depending from the saddle. The shaft 85 has a handle 122 releasably clutched to its front end, and is connected by bevel gearing 123 with a cross shaft 124 on which a handle may be applied adjacent the rear of the knee.

Figure 15:
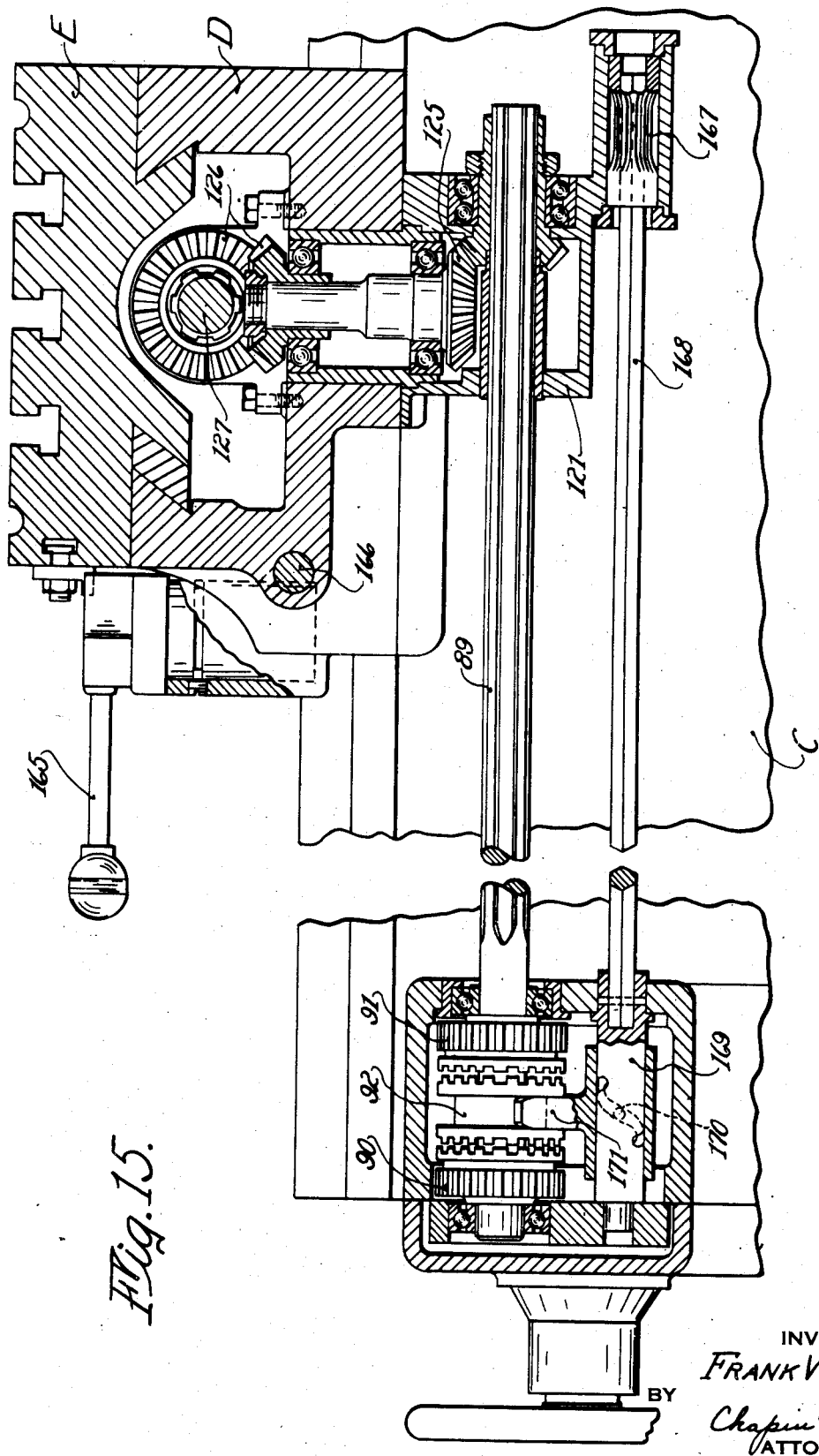
Fig. 15 is a detail of the table drive, taken on line 15—15 of Fig. 5.

The table drive is best shown in Fig. 15. The table drive shaft 83 is splined so as to slide freely in one of a pair of bevel gears 125 mounted in the bracket 121. Through a second pair of bevel gears 126 connected to the first pair the splined and threaded table screw may be rotated. The details of this drive are set forth in my Patent 2,230,716, February 4, 1941, and will not be repeated at length here.

The controls for actuating the knee, saddle and table in both directions or for maintaining these parts at rest will now be considered. The main knee control handle 129 (Figs. 1, 5, and 6) is mounted on a shaft 130 which passes through a sleeve 131 into the knee structure and has a pinion 132 meshing with a gear segment 133 forming part of a rocking shifter 134 which engages the knee clutch 83. To obtain a rear control, the shaft 130 is provided with a pinion 135 engaging a rack bar 136 extending from front to back in the knee. At its rear end the rack bar engages a wide pinion 137 mounted on a control shaft 138 provided with a handle 139. The wide pinion 137 is also geared to rack teeth on a vertical plunger 140 which cooperates with stops 141 mounted on the column.

Figure 1:
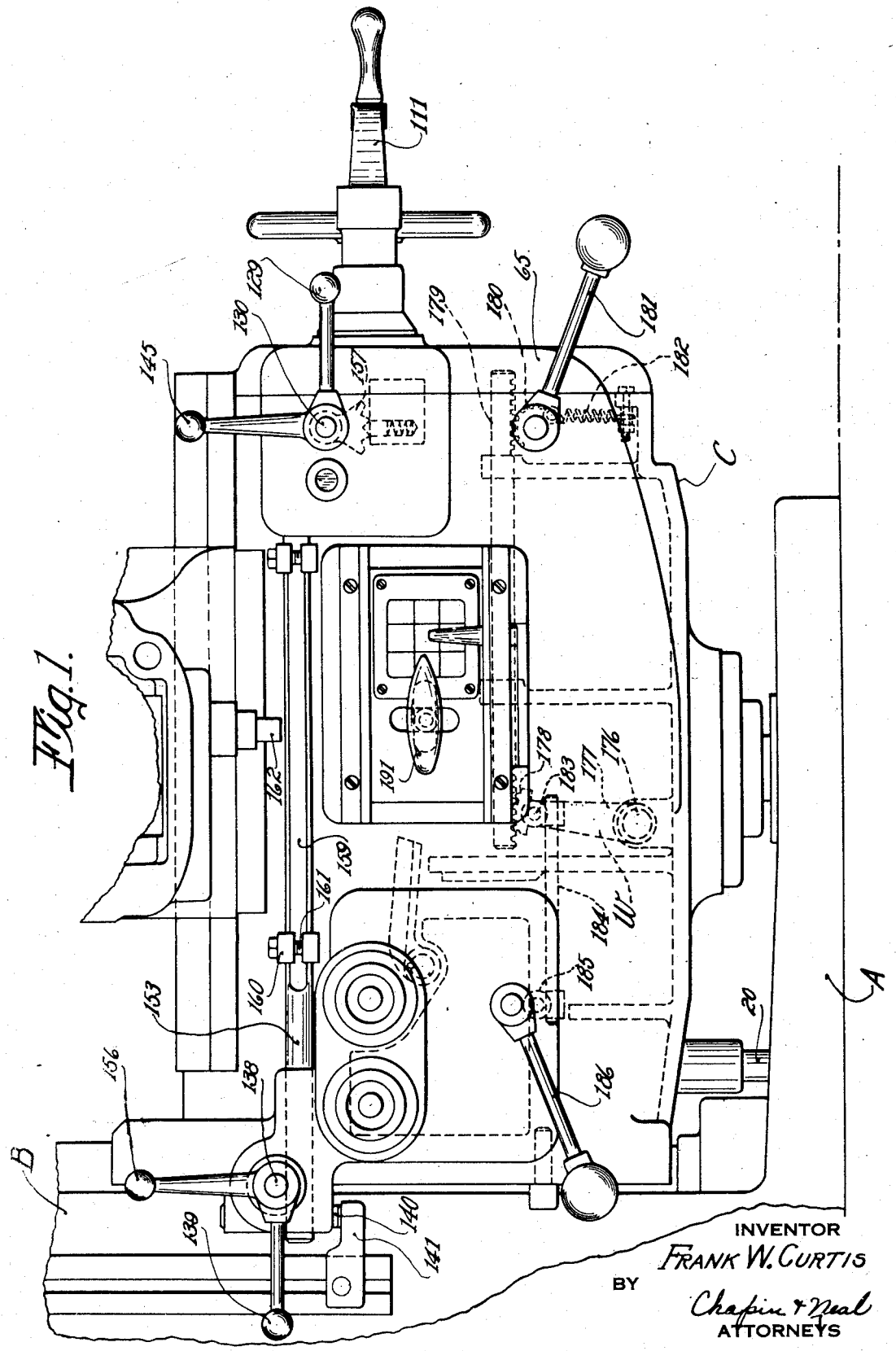
Fig. 1 is a side elevation of the knee of a milling machine embodying my invention, the saddle and table being broken away.

The saddle control embodies a handle 145 mounted on the sleeve 131, the latter being connected by gearing 146 with a shaft 147 running parallel to the knee control shaft 130. The shaft 147 has a pinion 148 engaging teeth on a segment 149 keyed to a shaft 150 upon which is freely carried the shifter 134 for the knee clutch 83, and to which is secured the shifter 151 for the saddle clutch 88. To obtain a rear control for the saddle the shaft 147 is provided with a pinion 152 coupling it to a rack bar 153 extending from front to back in the knee parallel to the shaft 136. The rack bar is geared at its rear end to a pinion 154 mounted on a sleeve 155 and carrying a handle 156. Both the shafts 147 and 130 may be provided with detent mechanism 157 and 158 (Fig. 6) of a usual type for holding the clutches either in engaged position or in an intermediate inactive position. The general form of detent mechanism is shown in Fig. 1. The rack bar 153 has one flat side 159 and carries stops 160. The stops are held in place by bolts 161 which extend close to the flat side. Since this flat side does not extend the entire length of the rack bar, as will be clear from Fig. 1, it is impossible for the stops to be pushed off or to a position in which damage can be caused to the mechanism by overtravel of the saddle. The stop dogs 160 cooperate with a fixed stop 162 carried by the saddle.

The table operating mechanism is indicated roughly in Fig. 15 and is described in detail in my Patent 2,230,716, referred to above. A control handle 165 is pivotly mounted at the front of the saddle and is geared to a rack bar 166, the latter being connected as described in said application with a pinion 167 on a hexagonal bar 168. The latter bar has a cam 169 engaging a pin 170 carried by the shifter 171 which engages the table operating clutch 92.

The various control devices for varying the rate of the power feed will now be described. The rapid traverse clutch is operated by a shifter 175 (Figs. 4 and 10) which engages the sleeve 31 to shift it either into a position to cause engagement of the clutch member 61 and 62 and thus feed the common driver at a feed rate, or in a position to cause engagement of the multiple plate clutch 29 and thus cause operation of the common driver at rapid traverse rate. The shifter 175 is carried on a rock shaft 176 (Figs. 1 and 4) to which an arm 177 is secured. At the end of this arm is a gear segment 178 meshing with a rack bar 179 extending toward the front of the machine and there engaging a pinion 180 having a handle 181 projecting forwardly of the machine. The handle is drawn down by a spring 182 so that when the handle is released after having been drawn upwardly to secure a rapid traverse operation it will automatically drop and cause the mechanism to return to feed rate. The various inactive clutch positions are secured by the clutches controlling the reversing of the knee, saddle and table and it is therefore undesirable that the rapid traverse clutch assume a neutral position. To secure operation of the rapid traverse from the rear of the machine the arm 177 is pivotly coupled at 183 to a rod 184 having pivotal connection at 185 with a handle 186.

The mechanism for selecting the eighteen different feed rates will now be described with particular reference to Figs. 16 to 19. A handle 190, universally mounted as will be described, has a grip 191 at its outer end which also serves as a pointer to indicate the angular position of its shaft. The handle has a spherical portion 192 extending into a horizontal slot 193 in a plate 194 and into a vertical slot 195 in a plate 196. These slots are preferably tapered, as is best shown in Fig. 18, so as to prevent the handle from endwise movement. The plate 196 is slidable back and forth in ways 197 formed in a cover 198 attached to the knee frame C. The plate 194 is vertically movable on ways 201 also formed in the cover 198, as is best shown in Fig. 16. The plate 196 carries a chart 202 while a pointer 203 is mounted on the plate 194 by a bracket 204.

Figure 8:
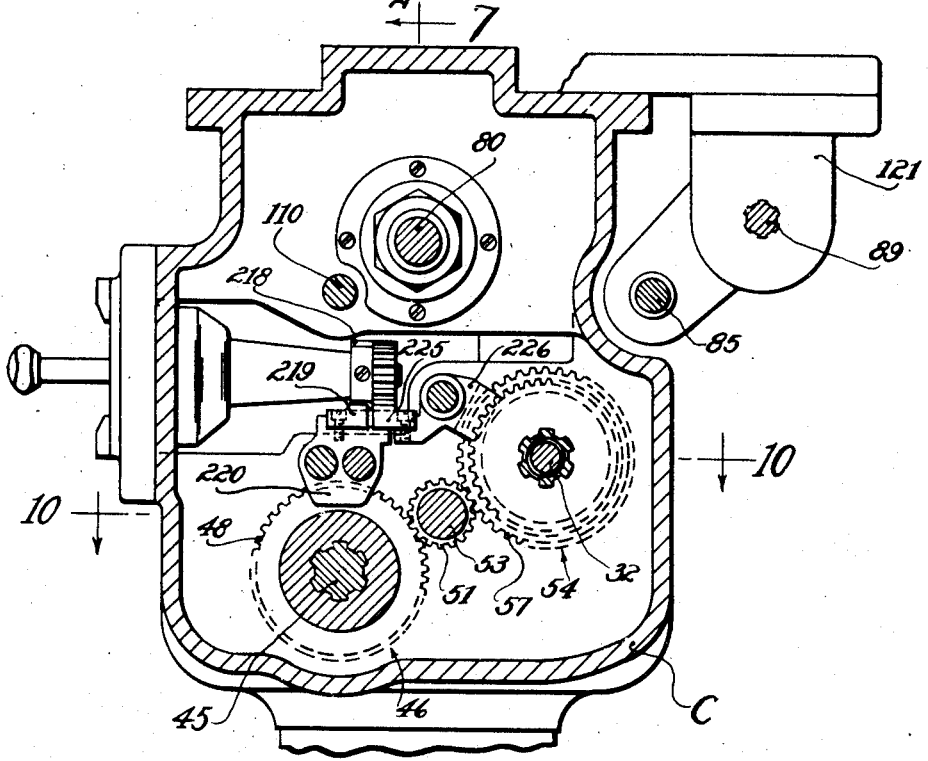
Fig. 8 is a section on line 8—8 of Figs. 4, 5 and 10.
Figure 9:
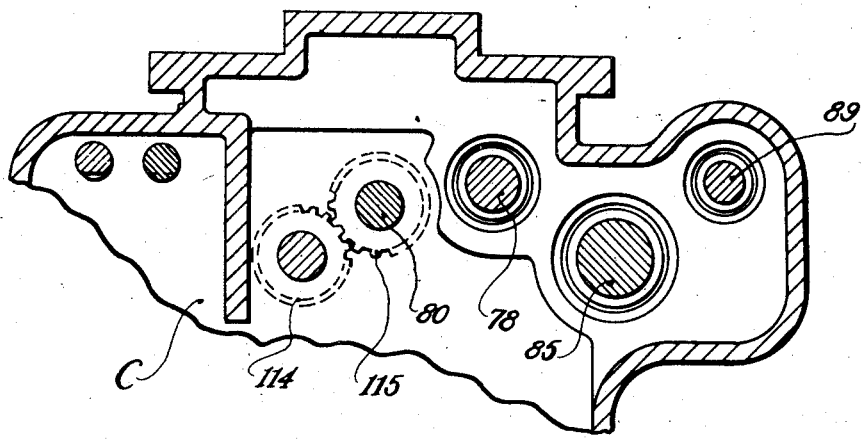
Fig. 9 is a fragmentary section on line 9—9 of Fig. 5.

The handle 190 also carries a spherical member 205 having pins 206 projecting laterally into slots 207 formed in a socket 208 in the end of a rod 209. This rod is journaled in the cover 198 and has at its end a gear 210 meshing with a gear segment 211 at the end of a lever 212 secured to a shaft 213. This shaft, as is best shown in Figs. 10 and 13, also carries a shifter 214 for actuating the clutch 42 of the back gears. The vertically movable plate 194 is formed with a rack 215 engaging a gear 216 on a shaft 217 mounted in the cover 198. This shaft has a gear 218 at its end meshing with a rack 219 (Fig. 8) carrying a shifter 220 actuating the cluster gear 46. A rack 221 on the horizontally movable plate 196 meshes with a gear 222 on a shaft 223 mounted in the cover 198 and carrying at its end a gear 224 meshing with a rack 225. As is shown in Figs. 8 and 13 this rack carries a shifter 226 actuating the cluster gear 54. The plate 194 is held in either one of three positions by a spring detent 230 engageable in holes 231 while the plate 196 is similarly held by a spring detent 232 engageable in holes 233. The pointer 203 moves vertically to indicate which one of the three horizontal rows on the chart 202 is to be read while the chart itself moves horizontally to bring one of the three vertical columns thereon opposite the pointer. Nine changes of speed are thus brought about and indicated. In order to indicate also the additional doubling of speeds brought about by the back gears, each of the nine sub-divisions in the chart are preferably printed with two indicia, the high or the low reading being taken in accordance with the position of the pointer 191.

What I claim is:

1. In a machine tool having a bed, a knee vertically movable on the bed, a saddle transversely movable on the knee, a table longitudinally movable on the saddle, and a tool mounted for operation upon work carried by the table; mechanism for moving the knee, saddle, and table comprising a common drive shaft extending from the front of the knee towards the back, a main drive in axial alignment with the rear end of the shaft, a sleeve surrounding the shaft, a clutch connecting the shaft alternatively with the main drive or with the sleeve, speed changing mechanism within the knee laterally disposed with respect to said shaft and connecting the main drive with the sleeve, drive shafts for the knee, saddle and table each running from the front of the knee rearwardly, reversing clutch mechanism for each of said drive shafts each including a forward and a reverse gear and being positioned near the front of the knee, and distributing gearing positioned near the front of the knee and connecting the common drive shaft with said reversing clutches.

2. In a machine tool having a bed, a knee vertically movable on the bed, a saddle transversely movable on the knee, a table longitudinally movable on the saddle, and a tool mounted for operation upon work carried by the table; mechanism for moving the knee, saddle, and table comprising a common drive shaft extending from the front of the knee towards the back, a main drive in axial alignment with the rear end of the shaft, a vertical drive shaft mounted on the bed and telescoping the knee, bevel gearing having splined connection with the vertical drive shaft and coupled to said main drive, a sleeve surrounding the shaft, a clutch connecting the shaft alternatively with the main drive or with the sleeve, speed changing mechanism within the knee laterally disposed with respect to said shaft and connecting the main drive with the sleeve, drive shafts for the knee, saddle and table each running from the front of the knee rearwardly, reversing clutch mechanism for each of said drive shafts each including a forward and a reverse gear and being positioned near the front of the knee, and distributing gearing positioned near the front of the knee and connecting the common drive shaft with said reversing clutches.

3. In a machine tool having a bed, a knee vertically movable on the bed, a saddle transversely movable on the knee, a table longitudinally movable on the saddle, and a tool mounted for operation on work carried on the table; mechanism for moving the knee, saddle and table comprising a rotatable shaft journaled in the bed and received telescopically within the knee, a bevel gear splined to said shaft and journaled in the knee, a second bevel gear having its axis horizontal and meshing with said first gear, a common drive shaft extending from the front of the knee toward the back in axial alignment with the second bevel gearing, a sleeve surrounding the shaft, a clutch connecting the shaft alternatively with the second bevel gear or with the sleeve, speed changing mechanism within the knee connecting said drive shaft with the sleeve, drive shafts for the knee, saddle and table each running from the front of the knee rearwardly, reversing clutch mechanism for each of said drive shafts, and distributing bearing connecting said common drive shaft with each of said reversing clutches.

4. In a machine tool having a bed, a knee vertically movable on the bed, a saddle transversely movable on the knee, a table longitudinally movable on the saddle, and a tool mounted for operation on work carried on the table; mechanism for moving the knee, saddle and table comprising a common drive shaft extending from the front of the knee toward the back, a broad faced pinion driven from said shaft, a reversing countershaft driven from said pinion, and a plurality of table shifting devices, each having one gear driven from said pinion and another gear driven from said countershaft, and a reversing clutch for coupling said device to either of said gears.

5. In a machine tool having a bed, a knee vertically movable on the bed, a saddle transversely movable on the knee, a table longitudinally movable on the saddle, and a tool mounted for operation on work carried on the table; mechanism for moving the knee, saddle and table comprising a common drive shaft extending from the front of the knee toward the back, a broad faced pinion driven from said shaft, a reversing countershaft driven from said pinion, a pair of aligned gears, one meshing with said pinion and the other with said reversing countershaft, a clutch engageable with either of said gears, knee elevating means operable by said clutch, a second pair of aligned gears one engageable with said pinion and the other driven from said reversing countershaft, a clutch engageable alternatively with either of said gears, a saddle shifting device driven by said clutch, a third aligned pair of gears each engageable with one of a pair of said aligned gears, a clutch movable into engagement with either of said gears and table driving means driven by said clutch.

6. In a machine tool having a bed, a knee vertically movable on the bed, a saddle transversely movable on the knee, a table longitudinally movable on the saddle, and a tool mounted for operation on work carried on the table; mechanism for moving the knee, saddle and table comprising a common drive shaft extending from the front of the knee toward the back, a broad faced pinion driven from said shaft, a reversing countershaft driven from said pinion, a pair of aligned gears, one meshing with said pinion and the other with said reversing countershaft, a clutch engageable with either of said gears, knee elevating means operable by said clutch, a second pair of aligned gears one engageable with said pinion and the other driven from said reversing countershaft, a clutch engageable alternatively with either of said gears, a saddle shifting device driven by said clutch, a third aligned pair of gears each engageable with one of that pair of aligned gears connected with the saddle shifting device, a clutch movable into engagement with either of said gears and table driving means driven by said clutch.

7. In a machine tool having a bed, a knee vertically movable on the bed, a saddle transversely movable on the knee, a table longitudinally movable on the saddle, and a tool mounted for operation on work carried on the table; mechanism for moving the knee, saddle and table comprising a vertical driving shaft journaled in the bed and telescopically received within the knee, a common drive shaft extending from front toward the back within the knee, mechanism for driving said shaft from the vertical shaft at either a feed rate or a quick traverse rate, drive shafts for the knee, saddle and table each running from the front of the knee rearwardly, reversing clutch mechanism associated with each of said shafts and located at the front of the knee, and distributing gearing connecting said reversing clutches with the common drive shaft.

8. In a machine tool having a bed, a knee vertically movable on the bed, a saddle transversely movable on the knee, a table longitudinally movable on the saddle, and a tool mounted for operation on work carried on the table; drive shafts for the knee, saddle and table extending from the front of the knee toward the back, a common drive shaft also extending from front to back, a removable bearing plate on the front of the knee perforated in alignment with each of said shafts, anti-friction bearings carried by the plate for each of said shafts, gearing connecting the shafts to the common driver and a removable cover plate located on the front of the knee exterior to said bearing plate.

9. In a tool having a bed, a knee movable on the bed, a saddle transversely movable on the knee, a table longitudinally movable on the saddle, and a tool operable for work carried on the table; mechanism for moving the knee, saddle, and table, comprising a common driving shaft extending from front to back in the knee, means for driving said shaft at either a feed or quick traverse rate, mechanism for moving the knee and saddle driven from said shaft, a reversing clutch for the table coupled to said common driving shaft and located in the front of the knee with its axis parallel to the common driving shaft, and driving connections between said clutch and the table.

10. In a tool having a bed, a knee movable on the bed, a saddle transversely movable on the knee, a table longitudinally movable on the saddle, and a tool operable for work carried on the table; mechanism for moving the knee, saddle, and table comprising a driving shaft extending from front to back in the knee, a table feed shaft mounted in the knee and parallel to the driving shaft, a reversing clutch for the table located in the front of the knee and coupled to said shafts with its axis parallel thereto, and driving connections between the feed shaft and the table.

11. The combination with a column, of a knee frame mounted for vertical movement thereon, a driving unit mounted in the knee frame adjacent the column, a combined feed and rapid traverse shaft mounted in the knee and having one end adjacent said unit, a friction clutch mounted coaxially with the shaft at one end thereof and driven directly from said driving unit, a feed transmission mounted in the knee frame and driven from said driving unit, a dog clutch mounted coaxially with the shaft at a point remote from the driving unit and driven by said feed transmission, a common member keyed on the shaft for reciprocation thereon to cause alternative engagement of the clutches with the shaft, drive shafts for the knee, saddle and table, each running from the front of the knee rearwardly, reversing clutch mechanism associated with each of said shafts and located at the front of the knee, and distributing gearing connecting said reversing clutches with said combined feed and rapid traverse shaft.

12. The combination, with a frame, of a knee frame movable vertically thereon, of a bevel gear therein, means for driving said gear in any vertical position of the knee frame, a second bevel gear driven from the first and having its axis horizontal, a horizontal combined feed and rapid traverse shaft adjacent the second bevel gear, a friction clutch member mounted on said shaft adjacent the second bevel gear and coupled to said gear, a spur gear member coupled to said second bevel gear, a variable feed transmission driven from said spur gear, a dog clutch mounted on said shaft at a point remote from the second bevel gear and driven by the feed transmission, a common actuating member slidable on the shaft and movable alternatively to cause engagement of either the friction or the dog clutch to drive the shaft at either rapid traverse or feed rates, drive shafts for the knee, saddle and table, each running from the front of the knee rearwardly, reversing clutch mechanism associated with each of said shafts and located at the front of the knee, and distributing gearing connecting said reversing clutches with said combined feed and rapid traverse shaft.

13. The combination with a column, of a knee frame mounted for vertical movement thereon, a driving unit mounted in the knee frame adjacent the column, a combined feed and rapid traverse shaft mounted in the knee and having one end adjacent said unit, a friction clutch mounted on said end of the shaft and driven directly from said driving unit, a feed transmission mounted in the knee frame and driven from said driving unit, a dog clutch mounted on the shaft at a point remote from the driving unit and driven by said feed transmission, a common shifting member mounted for reciprocation on the shaft and movable to cause alternative engagement of the clutches with the shaft, drive shafts for the knee, saddle and table, each running from the front of the knee rearwardly, reversing clutch mechanism associated with each of said shafts and located at the front of the knee, and distributing gearing connecting said reversing clutches with said combined feed and rapid traverse shaft.

14. The combination, with a frame, of a knee frame movable vertically thereon, of a bevel gear therein, means for driving said gear in any vertical position of the knee frame, a second bevel gear driven from the first and having its axis horizontal, a horizontal combined feed and rapid traverse shaft adjacent the second bevel gear, a friction clutch member mounted on said shaft adjacent the second bevel gear and coupled to said gear, a spur gear member coupled to said second bevel gear, a variable feed transmission driven from said spur gear, a dog clutch mounted on said shaft at a point remote from the second bevel gear and driven by the feed transmission, and a common actuating member slidable on the shaft and movable alternatively to cause engagement of either the friction or the dog clutch to drive the shaft at either rapid traverse or feed rates, drive shafts for the knee, saddle and table, each running from the front of the knee rearwardly, reversing clutch mechanism associated with each of said shafts and located at the front of the knee, and distributing gearing connecting said reversing clutches with said combined feed and rapid traverse shaft.

15. A machine tool having a bed, a knee vertically movable on the bed, a saddle transversely movable on the knee, a table longitudinally movable on the saddle, and a tool mounted for operation on work carried on the table; mechanism for moving the knee, saddle and table comprising a vertical driving shaft journaled in the bed and telescopically received within the knee, a common drive shaft extending from front toward the back within the knee, variable feed gearing within the knee and driven from said vertical driving shaft, clutch mechanism connecting said common drive shaft to the vertical driving shaft for rapid traverse operation or through the feed gearing for feed operation, a drive shaft for the knee extending from front to back within the knee structure, drive shafts for the saddle and table mounted externally of the knee and journaled in the knee structure at their forward ends, reversing clutch mechanism associated with each of said shafts and located at the front of the knee, distributing gearing connecting said reversing clutches with a common drive shaft, a bracket depending from the saddle and having threaded engagement with the saddle drive shaft for reciprocation thereof, and mechanism within said bracket for receiving motion from the table drive shaft and transmitting it to the table.

16. A machine tool having a gear box, three separately adjustable and serially connected change gear units therein, a single handle, mechanism operable by movement of the handle in one plane for adjusting one gear unit, mechanism operable by movement of the handle in a plane at right angles thereto for adjusting a second gear unit, and mechanism operable by rotation of the handle for adjusting the third gear unit.

17. A machine tool having a gear box, three separately adjustable and serially connected change gear units therein, a single handle, mechanism operable by movement of the handle in one plane for adjusting one gear unit, mechanism operable by movement of the handle in a plane at right angles thereto for adjusting a second gear unit, mechanism operable by rotation of the handle for adjusting the third gear unit, a chart shiftable by movement of the handle in one plane, a pointer mounted for cooperation with the chart and shiftable by movement of the handle in the second-named plane, and an index carried by the handle for showing the position of rotation thereof.

18. A machine tool having a gear box, three separately adjustable and serially connected change gear units therein, a shifter for one of the gear units, connections including a universal coupling between said handle and the shifter to cause movement of the shifter upon rotation of the handle, a pair of slides mounted for movement at right angles to each other and having crossed slots each extending at right angles to the direction of movement of the slide in which it is formed and embracing the handle to be moved by tilting movement thereof, shifters for the second and third gear shifters, and connections between each slide and one of the shifters.

19. A machine tool having a gear box, three separately adjustable and serially connected change gear units therein, a shifter for one of the gear units, connections including a universal coupling between said handle and the shifter to cause movement of the shifter upon rotation of the handle, a pair of slides mounted for movement at right angles to each other and having crossed slots each extending at right angles to the direction of movement of the slide in which it is formed and embracing the handle to be moved by tilting movement thereof, shifters for the second and third gear shifters, connections between each slide and one of the shifters, a chart secured to one of the slides, a pointer secured to the other of the slides in position to coact with the chart, and an index carried by the handle for showing the position of rotation thereof.

FRANK W. CURTIS.

CERTIFICATE OF CORRECTION.

Patent No. 2,301,525.　　　　　　　　　　　　　　　November 10, 1942.

FRANK W. CURTIS.

It is hereby certified that error appears in the printed specification of the above numbered patent requiring correction as follows: Page 1, first column, line 8, before the word "rates" insert --movements at either feed or rapid traverse--; page 3, second column, line 35, for "in a" read --into a--; and that the said Letters Patent should be read with this correction therein that the same may conform to the record of the case in the Patent Office.

Signed and sealed this 22nd day of December, A. D. 1942.

(Seal)　　　　　　　　　　　　　　　　　　　　　Henry Van Arsdale,
　　　　　　　　　　　　　　　　　　　　Acting Commissioner of Patents.